United States Patent [19]
Jerome

[11] 4,282,948
[45] Aug. 11, 1981

[54] MOTOR VEHICLE PROPULSION SYSTEM

[76] Inventor: George A. Jerome, 8413 Fullbright Ave., Canoga Park, Calif. 91306

[21] Appl. No.: 62,673

[22] Filed: Aug. 1, 1979

[51] Int. Cl.³ .............................................. B60K 9/04
[52] U.S. Cl. ..................... 180/165; 74/572; 416/60
[58] Field of Search ............... 180/165, 305, 306; 280/216, 217; 416/60; 74/572; 192/57, 58 R, 58 A

[56] References Cited

U.S. PATENT DOCUMENTS

| | | | |
|---|---|---|---|
| 3,672,244 | 6/1972 | Nasvytis | 180/165 X |
| 3,870,116 | 3/1975 | Seliber | 180/165 |
| 3,930,744 | 1/1976 | Theis, Jr. | 415/202 X |
| 4,069,669 | 1/1978 | Pitkanen | 74/572 X |

*Primary Examiner*—Robert R. Song
*Assistant Examiner*—Michael Mar
*Attorney, Agent, or Firm*—Allan M. Shapiro

[57] ABSTRACT

Small constant power engine drives liquid filled flywheel to store large amounts of kinetic energy. When motor vehicle acceleration is desired, the flywheel liquid is coupled to a turbine which is connected through a drive train to drive the rear wheels. The transfer of liquid from the flywheel kinetic energy storage to the turbine controls vehicle acceleration.

12 Claims, 6 Drawing Figures

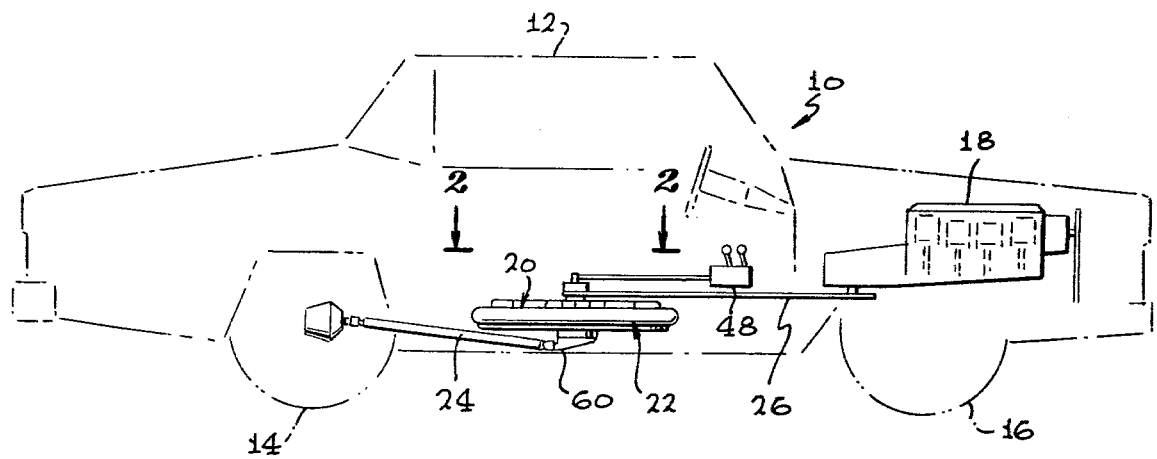
FIG. 1
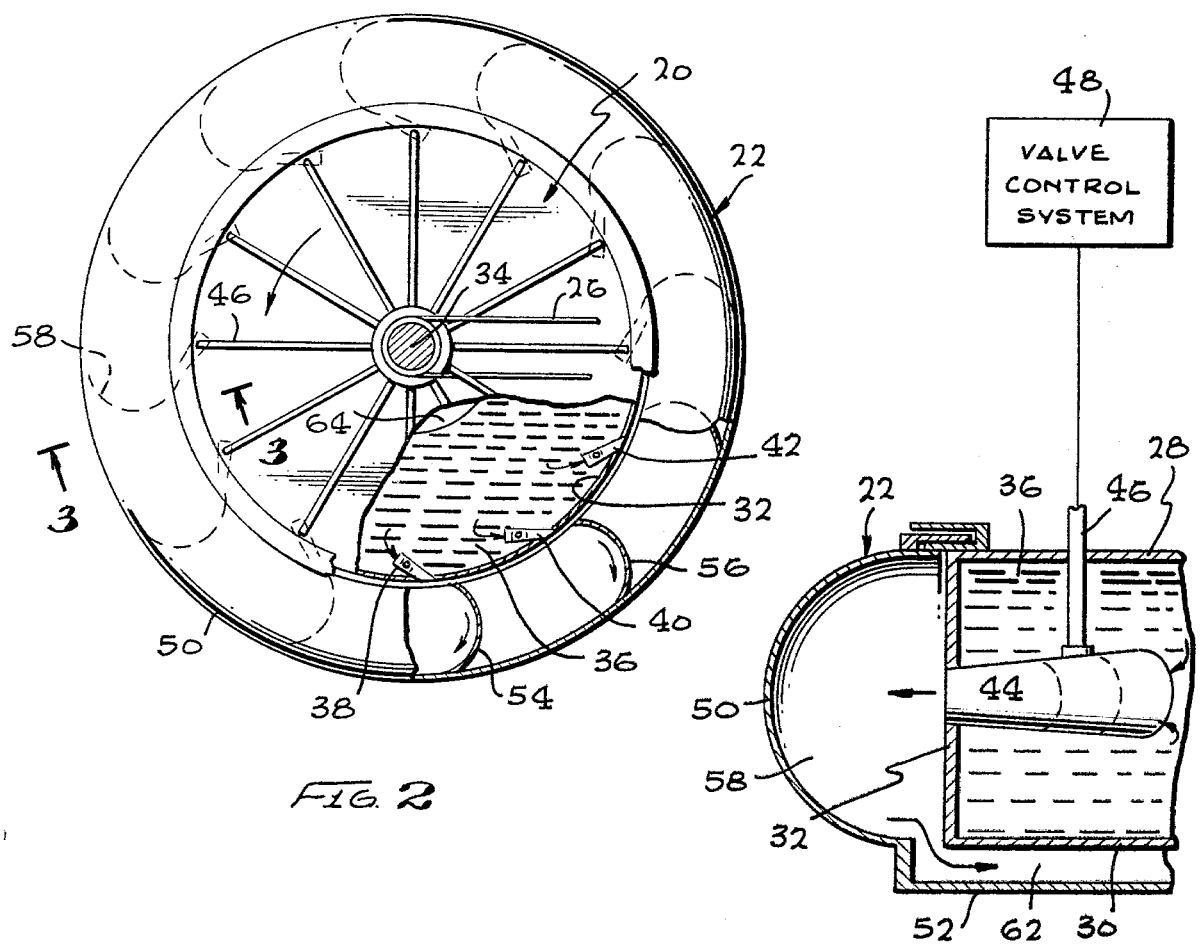
FIG. 2
FIG. 3

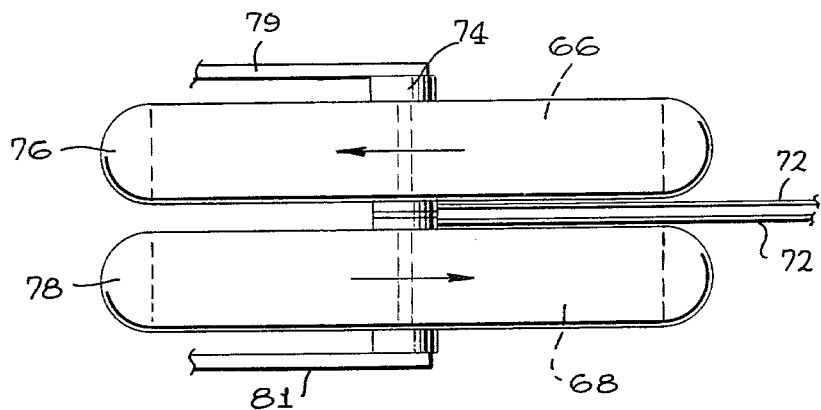
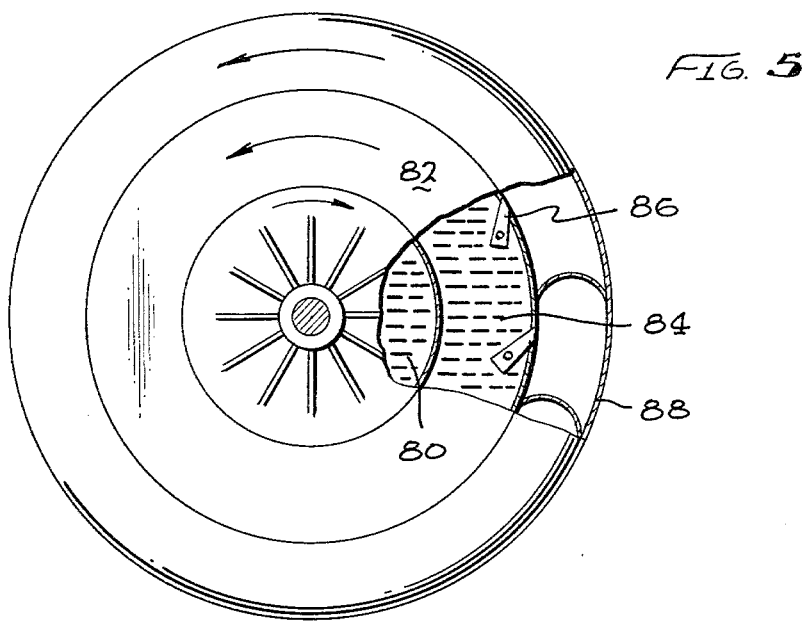
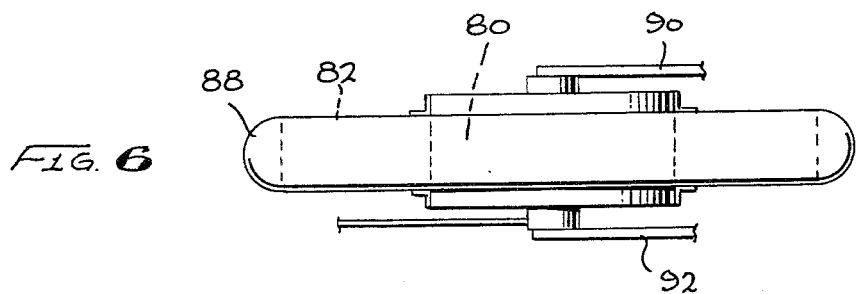

MOTOR VEHICLE PROPULSION SYSTEM

BACKGROUND OF THE INVENTION

1. Field of the Invention

This invention is directed to a motor vehicle propulsion system wherein kinetic energy is stored in a flywheel and is transferred on demand to accelerate and propel the vehicle. The flywheel is liquid-filled, and the transfer of energy is accomplished by the kinetic energy of the liquid.

2. Description of the Prior Art

The conventional automobile has been in existence since approximately 1898. During the past 80 years, automobile design has led to increasing vehicle weight, larger engines, increasing comfort features, concern for engine emissions, and decreasing fuel economy. In the operation of an automobile, energy is required to accelerate the vehicle upon driver demand and, when stopping of the vehicle is required, the kinetic energy of the vehicle is converted to heat by way of the braking system. The powering of present-day automotive vehicles is a demand system where the engine is large enough to provide the power necessary for maximum acceleration while, for the majority of operating conditions, only a small amount of the maximum energy power is required. Present-day efforts at improving fuel economy have been directed toward improving power efficiency in the engine without addressing the basic problem of having an oversized engine. Improving fuel efficiency has been carried far forward so that any further improvement in motor vehicle propulsion efficiency must be directed to a basic system of greater potential than the elementary demand system described above.

SUMMARY OF THE INVENTION

In order to aid in the understanding of this invention, it can be stated in essentially summary form that it is directed to a motor vehicle propulsion system wherein a small engine drives a liquid-filled flywheel to store kinetic energy in the liquid. Power is transferred to the vehicle propulsion wheels on driver demand by releasing the liquid to a turbine which is connected to the drive wheels through a drive train.

It is thus an object of this invention to provide a motor vehicle propulsion system wherein a small engine can be used to build up a significant amount of kinetic energy in a liquid filled flywheel, with the energy being coupleable to propel the vehicle through means of a driver demand controlled turbine. It is another object to provide a motor vehicle propulsion system wherein a small engine is capable of accelerating the motor vehicle by storing kinetic energy in a flywheel, with the flywheel being liquid-filled and hydraulically coupled to a turbine for rapid energy release. Another object is to provide a liquid-filled flywheel wherein kinetic energy is stored for propulsion usage, and the turbine mechanism coupled to propel the vehicle recovers kinetic energy from the vehicle and transfers it to the liquid-filled flywheel for deceleration of the vehicle, so that vehicle kinetic energy is recovered.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of the motor vehicle propulsion system of this invention, with an example of a motor vehicle with which it can be used shown in dashed lines.

FIG. 2 is a plan view of the first preferred embodiment of the flywheel-turbine assembly of the propulsion system of this invention.

FIG. 3 is an enlarged section taken generally along the line 3—3 of FIG. 2.

FIG. 4 is a side-elevational view of a second preferred embodiment of the motor vehicle propulsion system of this invention.

FIG. 5 is a plan view of the flywheel-turbine assembly of a third preferred embodiment of the motor vehicle propulsion system of this invention.

FIG. 6 is a side-elevational view of the structure of FIG. 5.

DESCRIPTION OF THE PREFERRED EMBODIMENTS

Motor vehicle 10 is generally indicated in FIG. 1. It has a body 12 for housing of its propulsion system, for the carrying of its driver and load, and has support wheels for support, guidance and propulsion. In the motor vehicle 10 illustrated in FIG. 1, the motor vehicle is illustrated as having forward guidance wheels 16 and rear propulsion wheels 14, but any other arrangement is feasible with the propulsion system of this invention. The propulsion system of this invention comprises engine 18 which serves as a basic prime mover, liquid-containing flywheel 20 which is driven by engine 18, turbine 22 which can extract energy from and return energy to the liquid-containing flywheel, and drive train 24 interconnecting the turbine with the drive wheels 14.

Engine 18 is the basic prime mover of the motor vehicle 10. It may be any prime mover, but it is particularly contemplated with respect to this invention that it be a combustion engine and particularly an internal combustion engine. It is contemplated that hydrocarbon fuel be the fuel employed with engine 18 in view of its convenience and simplicity of storage and combustion, but this invention is not limited to any particular prime mover. Engine 18 is sized to be able to propel the motor vehicle 10 and its load at a desired speed along a level highway, drive the auxiliaries of the motor vehicle, and may have a small amount of additional available power for supplying kinetic energy to flywheel 20.

Engine 18 drives flywheel 20 through drive connection 26. Drive connection 26 may be any convenient drive connection, including direct coupling, shaft or chain drive. Furthermore, in view of the relatively small amount of power transmitted, some belt drives are also feasible.

Flywheel 20 is a cylindrical structure having top wall 28, bottom wall 30 and cylindrical side wall 32 (see FIGS. 2 and 3). Flywheel 20 is mounted on central shaft 34 which is mounted for rotation in the body 12 of motor vehicle 10. For dynamic considerations discussed below, the flywheel 20 is preferably mounted near the longitudinal and transverse center of the motor vehicle. In view of that location, it is sometimes convenient to mount engine 18 elsewhere and drive it through drive connection 26. Otherwise, engine 18 can be directly mounted on top of flywheel 20. Flywheel 20 has liquid 36 therein. Liquid 36 is preferably water because of its weight and viscosity, inexpensive character and wide availability. When water is used, it may carry anti-rust and lubricity additives as well as anti-freeze additives for those cases where the motor vehicle may be used in a subfreezing ambient. With spinning of flywheel 20, liquid 36 is coupled thereto to spin with the flywheel. Internal vanes in the flywheel may be employed to increase coupling. Thus, engine 18 drives flywheel 20 and liquid 36 so that liquid 36 has a substantial amount of kinetic energy. A plurality of liquid nozzles are arranged around the flywheel in side wall 32 thereof. Nozzles 38, 40 and 42 are illustrated in FIG. 2, and nozzle 44 is illustrated in FIG. 3. A valve is positioned within each of the nozzles, and valve controller 46 is illustrated in FIGS. 2 and 3. In FIG. 2, the valve controllers are the radial connections which connect the valves to a central control. The central valve control system 48 is illustrated in FIGS. 1 and 3. In FIG. 1, it is illustrated as being under the direct control of the driver.

Turbine 22 is a half torus 50 mounted on bottom plate 52 which serves as its support and rotational coupling. Vanes are positioned inside the torus, with vanes 54 and 56 illustrated in FIG. 2 and vane 58 illustrated in FIGS. 2 and 3. When flywheel 20 is rotating and its liquid 36 carries the rotational kinetic energy of the flywheel system, the opening of the valves in the nozzles permits the high kinetic energy liquid to discharge against the vanes. The kinetic energy is converted to torque and rotation of turbine 22. The rotational drive is transmitted through bottom plate 52 to the bottom of turbine where it is connected to drive train 24. The connection is in the form of bevel gear box 60 which may contain automatic torque and turns ratio conversion depending on vehicle speed. From bevel gear box 60 to the rear axle, drive train 24 is a conventional driveshaft with universal joints. It includes a differential on the rear axle.

When the high kinetic energy liquid is discharged from the nozzles against the vanes in the turbine, it gives up its kinetic energy. The liquid falls to the bottom of the turbine and returns through channel 62 (see FIG. 3) to the center of the flywheel. Opening 64 (see FIG. 2) returns the liquid into the flywheel at a low kinetic energy location for continuous circulation of the liquid. Thus, the system is continuously liquid-filled, and the liquid circulates based on its kinetic energy. When the vehicle is moving and slowing down is desired, the valves are closed and the turbine 22 drives the liquid to increase its kinetic energy. Thus, kinetic energy is transferred from the vehicle into the liquid with consequent slowdown of the vehicle. In this way, kinetic energy is recovered from vehicle motion. Converting the kinetic energy of the moving vehicle into heat through braking is only necessary in panic stops. Because of the significantlysmaller engine, fuel economy is greatly improved. Furthermore, with the use of a small engine operating most of the time at its nominal maximum load, engine exhaust emissions can be more readily managed with a significant reduction in air pollution.

Because the flywheel 20 is not only an energy-storing device but also a massive gyroscope, when it is rotating at speed, it provides gyroscopic stability to the motor vehicle 10. With this stability, a relatively light structure of the motor vehicle has the equivalent enhanced stability of a larger, heavier vehicle. The stability of vehicle 10 will be substantially better than other vehicles of the same size. Due to the gyroscopic stability, it would be impossible for the motor vehicle 10 to roll over around its longitudinal axis. The gyroscopic effect of the flywheel makes the apparent weight, and, therefore, the stability of the vehicle much greater than the actual weight of the motor vehicle 10. As a consequence of that, a significant reduction in the use of structural material is possible for the building of the vehicle. This not only conserves resources, but achieves a significant cost reduction.

In view of the gyroscopic stability, precessional forces can be neutralized if they are determined to be a significant problem. FIG. 4 illustrates a pair of flywheels 66 and 68, each driven by its respective drive connection 70 and 72 from the engine similar to drive connection 26. The flywheels 66 and 68 rotate in opposite directions about the axis 74. Turbines 76 and 78 respectively surround flywheels 66 and 68 to form the same combination as the flywheel-turbine assembly 20-22. Nozzles are provided out of each of the flywheels 66 and 68 into turbines 76 and 78 together with valves to control them. In FIG. 4, the output drive trains 80 and 82 correspond to drive train 24. By contrarotation of the two flywheel-turbine assemblies, the precessional forces which would result from the vehicle being steered around a normal corner are balanced.

FIGS. 5 and 6 represent a flywheel-turbine assembly of a propulsion system in accordance with this invention which also equalizes the precessional forces but mounts the flywheels concentrically. Thus, inner flywheel 80 is an enclosed cylinder filled with liquid, and its only purpose is to provide gyroscopic stability and precession force balance. Outer flywheel 82 is concentric with inner flywheel 80 and has liquid 84 therein, the same as flywheel 20. Furthermore, it also has nozzles 86 which controllably release the liquid 84 with its high kinetic energy into turbine 88 to turn the turbine, the same as turbine 22. Inner flywheel 80 is driven in one direction by drive connection 90, while outer flywheel 82 is driven in the opposite direction by drive connection 92. Both of the drive connections are powered by the engine. Turbine 88 is connected through a suitable drive train to the rear wheels, similar to drive train 24. The construction of the flywheel-turbine illustrated in FIGS. 5 and 6 thus shows another embodiment wherein the motor vehicle propulsion system can have the benefits of gyroscopic stability and yet to overcome the problems of precessional forces by balancing the precession forces.

Thus, with such a flywheel-turbine assembly, kinetic energy can be stored and recovered.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A motor vehicle propulsion system comprising:
   a motor vehicle, wheels on said motor vehicle for supporting, guiding and propelling said motor vehicle, an engine on said motor vehicle, said propulsion system interconnecting said engine and said propelling wheels, said propulsion system comprising two flywheels mounted on said motor vehicle for rotation in opposite directions about a flywheel axis, said engine being connected to rotate said flywheels, said flywheels having liquid therein, said axis being substantially vertical in said vehicle;

a turbine positioned adjacent said flywheels for rotation on said axis, at least one nozzle mounted on at least one of said flywheels and interconnecting such flywheel and said turbine, said turbine being connected to said propelling wheels so that liquid in said nozzled flywheel having kinetic energy by reason of rotation of said flywheel by said engine can be discharged through said nozzle to said turbine to impart kinetic energy to said turbine and through said propelling wheels to said motor vehicle so that kinetic energy of said nozzled flywheel is converted to kinetic energy of vehicle motion, and liquid delivery from said nozzled flywheel to said nozzle to said turbine is controlled by a motor vehicle operator.

2. The motor vehicle propulsion system of claim 1 wherein one of said flywheels is positioned within the other of said flywheels.

3. The motor vehicle propulsion system of claim 1 wherein one of said flywheels is positioned above the other of said flywheels and there is a turbine associated with each of said flywheels.

4. A motor vehicle propulsion system comprising:

a motor vehicle, wheels on said motor vehicle for supporting, guiding and propelling said motor vehicle, an engine on said motor vehicle, said propulsion system interconnecting said engine and said propelling wheels, said propulsion system comprising two flywheels mounted on said motor vehicle for rotation in opposite directions about a flywheel axis, said engine being connected to rotate said flywheels, said flywheels having liquid therein, said axis being substantially vertical in said vehicle;

a turbine positioned adjacent said flywheels for rotation on said axis, at least one nozzle mounted on at least one of said flywheels and interconnecting such flywheel said turbine, said turbine being connected to said propelling wheels so that liquid in said nozzled flywheel having kinetic energy by reason of rotation of said flywheel by said engine can be discharged through said nozzle to said turbine to impart kinetic energy to said turbine and through said propelling wheels to said motor vehicle so that kinetic energy of said nozzled flywheel is converted to kinetic energy of vehicle motion.

5. The motor vehicle propulsion system of claim 4 wherein one of said flywheels is positioned within the other of said flywheels.

6. The motor vehicle propulsion system of claim 4 wherein one of said flywheels is positioned above the other of said flywheels and there is a turbine associated with each of said flywheels.

7. A propulsion system for a motor vehicle comprising:

two hollow flywheels for mounting on a motor vehicle for rotation on an axis in opposite directions with respect thereto, said flywheels being for containing liquid therein and being for rotation by a power source on said motor vehicle;

a turbine mounted with respect to said flywheels for rotation on said axis, at least one nozzle mounted on at least one of said flywheels and interconnecting such flywheel and said turbine, said turbine being for connected for propulsion of the motor vehicle so that kinetic energy stored in the liquid in the said at least one flywheel after having been delivered thereto by the power source is transferred to the propulsion of the motor vehicle by delivery of liquid at high kinetic energy to the turbine wherein the turbine transmits the kinetic energy to the vehicle.

8. The propulsion system of claim 7 wherein delivery of liquid having kinetic energy from said flywheel to said turbine is controlled by demand for delivery of kinetic energy from said flywheel to the vehicle.

9. The propulsion system of claim 8 wherein liquid delivery from said flywheel to said nozzle to said turbine is controlled by a motor vehicle operator.

10. The propulsion system of claim 7 wherein said axis is substantially vertical in the vehicle.

11. The propulsion system of claim 7 wherein one of said flywheels is positioned within the other of said flywheels.

12. The motor vehicle propulsion system of claim 7 wherein one of said flywheels is positioned above the other of said flywheels and there is a turbine associated with each of said flywheels.

* * * * *